2,950,267

PROCESS FOR BLENDING POLYPROPYLENE AND OXYGENATED POLYPROPYLENE

William E. Thompson, Wallingford, Denton M. Albright, Drexel Hill, and Archibald P. Stuart, Media, Pa., assignors to Sun Oil Company, Philadelphia, Pa., a corporation of New Jersey No Drawing. Filed June 21, 1957, Ser. No. 667,274

1 Claim. (Cl. 260—45.5)

This invention relates to new compositions of matter and methods for their preparation. More particularly, the present invention relates to new compositions consisting essentially of solid polymers of propylene or ethylene compounded with certain derivatives of such solid polymers of propylene, and to methods for their preparation.

Low molecular weight olefins such as ethylene and propylene have heretofore been polymerized to relatively low molecular weight liquids or soft amorphous solids through the use of polymerization catalysts such as aluminum trichloride, boron trifluoride, and the like. Such olefins can be polymerized to relatively high molecular weight solid polymers by contacting the olefin with a dispersion of titanium trichoride and an activator such as aluminum triethyl maintained in an inert, liquid reaction medium. Generally such processes produce polymers of propylene having molecular weights of above about 25,000 and usually within the range of from about 50,000 to 250,000, or polymers of ethylene having molecular weights of from about 16,000 to 10,000. A proportion of the solid products obtained with propylene using the mentioned catalyst appears crystalline, i.e., exhibits a crystalline structure by X-ray analysis. The crystalline polymer is relatively insoluble in the usual hydrocarbon solvents, such as the paraffins, including for example, the pentanes, hexanes, octanes, decanes, and the like, even at elevated temperatures. However, the crystalline polymer can be dissolved in such solvents at relatively high temperatures, as hereinafter described. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "prolypropylene," possess many desirable properties, they are not suitable for use in many applications because of their high brittle points. By "brittle point" is meant the temperature at which the polymer exhibits brittle failure under specific impact conditions as measured by ASTM test (D 746 55T). For example, thin films or fibers of polypropylene are not suitable in applications where flexibility is required such as for use as wrapping materials, because of cracking at temperatures encountered under usual room temperatures, or slightly below usual room temperatures. Likewise, polyproplyene is not suitable for preparing fluid containers, fluid conduits, or like articles for the same reason. Also, while polymers of ethylene generally exhibit good brittle points, they are difficult to process because they exhibit a low melt index.

Plasticizers as heretofore used with various plastic materials do not appear suitable for improving the brittle point of polypropylene because such materials lower the tensile strength and adversely affect other physical properties of the polymer, such as the melting point, melt index, and the like, and for similar reasons are not suitable for improving the melt index of polyethylene.

An object of the present invention is to provide a polypropylene composition having a low brittle point. Another object is to provide a new composition of matter having a low brittle point comprising a relatively high molecular weight polypropylene admixed with a minor quantity of a derivative of such high molecular weight polypropylene. A further object is to provide a process for preparing polypropylene compositions having a low brittle point in which other properties of the polypropylene are not adversely affected. Still another object is to provide an improved polyethylene composition.

It has now been found that solid polymers of propylene or ethylene having improved properties can be prepared by compounding polypropylene or polyethylene with a minor quantity of an oxygenated derivative of polypropylene. Only certain oxygenated derivatives are suitable for use in the compositions of the invention, and compounding of the components must be by certain means, as hereinafter described. The preparation of oxygenated derivatives of polypropylene is generally described in United States patent application Serial Number 638,222, filed on February 5, 1957, now Patent Number 2,911,384.

For convenience, the present invention is hereinafter described principally in terms of polypropylene, it being understood that polyethylene can be likewise used.

In accordance with the invention, polypropylene is oxidized by heating the polymer to a temperature above its melting point in contact with the oxygen. The variables used in the oxidation step must be correlated to give an oxygenated derivative of polypropylene as hereinafter described. The oxygenated derivative is then compounded with polypropylene by dissolving the two components in a solvent therefor and precipitating the dissolved polymer and derivatives from solution. The resulting composition has a low brittle point but retains the remaining beneficial properties of polypropylene.

The crystalline polypropylene used in the process of the invention is prepared by polymerized propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride, or a mixture thereof, is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about ° C. to 170° C. are suitable. Atmospheric pressure can be used although elevated pressures are preferred in that the polymerization reaction proceeds at a faster rate as such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the polymer during the contacting with the catalyst deactivating liquid to insure good catalyst deactivation. The polymer is then repeatedly washed to remove at least a major proportion of the residual inorganic material from the catalyst, and is then dried. The described procedure yields a product which is a mixture of a predominate amount of crystalline polypropylene with a minor amount of amorphous polypropylene. The amorphous polymer can be removed by dissolution in a hydrocarbon solvent at an elevated temperature below the temperature at which the crystalline polymer is dissolved. For example, dissolution of the amorphous polymer in n-pentane at the boiling point of n-pentane (under atmospheric pressure), or n-heptane, isooctane, tetrahydronaphthalene, decahydronaphthalene, or the like gives good results. The resulting crystalline polyproplyene is then used in the process of the invention. However, a quantity of the amorphous polymer, by which is meant the polymer which is soluble in n-pentane at the boiling point of n-pentane under atmospheric pressure, say up to about 10% by weight, can be present with the crystalline polymer and good results obtained. The crystalline polypropylene will generally have a molecular weight of from about 25,000 to 300,000 and usually from about 50,000 to 250,000, a melting point of from about 161° C. to 171° C., and exhibits a crystalline structure by X-ray analysis. The polypropylene may contain a small quantity of oxygen, such as from oxidation by contacting air, and good results obtained, even though such oxidation increases the brittle point of the polymer. Generally the quantity is below about 0.1%.

Crystalline polypropylene prepared as above described is heated to a temperature above its melting point, preferably to a temperature of from about 180° C. to 260° C., in contact with oxygen. The heating in contact with oxygen is maintained for a time sufficient to produce an oxygenated derivative melting within the range of from about 88° C. to 110° C. Preferably temperatures during the contacting with oxygen are maintained in the upper portion of the stated range, since the desired oxidation, and the reduction in molecular weight, occur in a shorter time under the relatively drastic conditions. The oxygen content of the atmosphere contacting the molten polypropylene can be varied substantially, say from about 10% to 40%, with good results. An atmosphere of air can be used and is preferred in many instances. Mixtures of oxygen and an inert gas such as nitrogen can be used with good results. Atmospheric pressure is advantageously used, but superatmospheric pressure can be employed to enhance the dissolution of oxygen in the molten polymer. Also, it is advantageous to stir the molten polypropylene during contact with oxygen to accelerate oxygenation and to insure a homogeneous product. The time of heating required will vary according to the temperature and quantity of oxygen in the surrounding atmosphere. Generally a time of from ½ to 24 hours is sufficient, although usually a time of less than 10 hours gives good results, especially when a relatively high temperature is employed.

The oxygenated derivative of polypropylene will contain less than 4% oxygen. It appears that a larger quantity of oxygen cannot be introduced, by the methods herein described, into the polypropylene polymers which can be employed in the process of the invention. Generally, the oxygen content will be at least 1.5% and will vary from about 1.5% to 3.7%. The melting point of the oxygenated derivative must be below 110° C. and may be within the range of from about 88° C. to 110° C. Unless the oxygen content and melting point are within the defined limitations, operative results are not obtained in accordance with the invention. For example, an oxygenated derivative of polypropylene melting within the range of from about 121° C. to 127° C. when compounded with polypropylene, fails to give an operable result. Also, oxidation of polypropylene to an extent such that the oxygen content thereof is the same as, or greater than, the oxygen content of the blended polymer compositions of the invention does not give a comparable composition.

The oxygenated derivative of polypropylene prepared as above described is compounded with unoxidized polypropylene. The quantity of the oxygenated derivative can be varied from about 0.5% to about 10% by weight with good results. Preferably a quantity of the oxygenated derivative of from about 3% to 8% is used since optimum results are obtained in this range.

As above stated, the means of compounding polypropylene with the oxygenated derivative is important. It is essential, in order to obtain a composition in accordance with the invention, that both the polypropylene and the oxygenated derivative be dissolved in a solvent therefor and simultaneously be precipitated from the solution. Solvents which can be employed are preferably the saturated hydrocarbons such as n-heptane, isooctane, the decanes, dodecanes, cyclohexanes, decahydronaphthalene, mixtures thereof and the like. An elevated temperature is necessary to dissolve the polypropylene, and sufficient pressure must be employed to maintain the solvent in the liquid phase. Preferably the temperature is maintained from about 130° C. to 170° C. in preparing the solution. Precipitation of the dissolved components can be by any convenient means. Preferably an anti-solvent such as acetone is added to the solution. Other anti-solvents such as other ketones, ethyl alcohol, isopropyl alcohol, or esters can be used. Precipitation can also be accomplished by cooling the hot solution, say to a temperature of about 20° C. or less. It is frequently desirable to combine cooling with the use of an anti-solvent. After precipitation, the composition is separated by any convenient means, such as by filtration, and is dried. The resulting composition contains from 0.5% to 10% by weight of the oxygenated derivative. The oxygen content of the final composition will vary according to the oxygen content of the oxygenated derivative as herein defined, and also with the quantity of the oxygenated derivative used, also as herein defined. The composition will have a melting point of from about 150° C. to 175° C., a hardness of from about 50 to 65 (ASTM D314–39) and a brittle point of less than about —8° C. (ASTM D746–55T).

If desired, small amounts of other additives can be added to the composition of the invention in order to obtain certain desirable properties. For example, small amounts of anti-oxidants are useful in preventing further oxidation of the components of the composition. Anti-oxidants such as 2,2-methylene bis (4-methyl-6-tertiary butyl phenol) give good results in quantities of from about .15% to 5% by weight.

The following examples illustrate the process of the invention in which "parts" refers to parts by weight.

*Example 1*

Polypropylene was prepared by introducing, under anhydrous and substantially oxygen-free conditions, 9.90 parts of titanium trichloride and 7.76 parts of aluminum triisobutyl into about 280 parts of a mixture of saturated hydrocarbons consisting principally of octanes contained in a reactor. The temperature of the resulting slurry was adjusted to 89° C. and propylene was introduced into the reactor to a pressure of 100 p.s.i.g. The temperature was maintained in the range of about 89° C. to 90° C. and the pressure at substantially 100 p.s.i.g. by the periodic addition of propylene for 11.38 hours. The catalyst was deactivated with water and extracted with a 10% alcoholic solution of nitric acid. Low molecular weight materials were removed by dissolving in hot n-pentane. There were recovered 1,352.5 parts of polypropylene having a molecular weight of 150,000.

A portion of the polypropylene was heated in contact with air for about 5 hours at a temperature of about 243° C. The product was a brownish grease-like material melting within the range of from 99° C. 102° C. and having an oxygen content of 3.65%. Various quantities of the so-obtained oxygenated product were blended with unoxidized polypropylene containing 0.2% of 2,2-methylene bis (4-methyl-6-tertiary butyl phenol) as an inhibitor. The blends were obtained by dissolving both the oxygenated derivative and polypropylene in appropriate quantities in decahydronaphthalene and precipitating the dissolved materials by adding acetone. The results obtained are shown in the following table, wherein for comparison there is shown the properties of the polypropylene used to prepare the present compositions:

|  | Polypropylene With Oxygenated Derivative | | | Polypropylene Without Oxygenated Derivative |
| --- | --- | --- | --- | --- |
| Wt. Percent Oxygenated Derivative | 1.5 | 7 | 10 | 0 |
| Hardness [1] | 52 | 62 | 64 | 75-80 |
| Wt. Percent Oxygen in Composition | 0.13 | 0.25 | 0.3 | 0 |
| Melting Point (° C.) | 157 | 171 | 173 | 169 |
| Brittle Point (° C.) [2] | −15 | −15 | −12 | Above 7 |

[1] Determined by ASTM (D-314-52).
[2] Determined by ASTM (D-746-55T).

An attempt was made to prepare the above compositions by melting polypropylene and dissolving therein the above-indicated quantities of the oxygenated derivative. In each instance the brittle points of the resulting compositions were above +15° C.

A portion of the polypropylene prepared as above described was oxidized to contain 0.08% oxygen; the resulting material had a brittle point of above 10° C.

*Example 2*

Polypropylene prepared as above described was heated at 204° C. for a time sufficient to give an oxygenated product having a melting point within the range of from 121° C. to 127° C. and an oxygen content of 3.36%. Dissolving 0.99 part of the oxygenated derivative in 99.3 parts of molten polypropylene inhibited with .2% of 2,2-methylene bis (4-methyl-6-tertiary butyl phenol), increased the brittle point of the polypropylene from about 10° C. to 21° C., and a sheet molded from the composition was crumbly and brittle.

*Example 3*

Polypropylene prepared as described in Example 1 was heated in air to about 148° C. until the oxygen content was 0.27%. A quantity of this material sufficient to give 5% by weight was blended into the unoxidized polypropylene by dissolving in decachydronaphthalene and precipitating as above described. The resulting composition had a brittle point of above 10° C.

Example 1 illustrates specific embodiments of the invention. When other compositions within the herein described limits are prepared as herein described, substantially equivalent results are obtained. For example, oxidized polypropylene as above described is miscible with, and improves the properties of, polyethylene. Thus, polyethylene having a molecular weight of about 20,000 and a melt index of 0.5, when compounded as above described with about 10% of oxidized polypropylene, exhibits a melt index of about 0.9, and films formed therefrom exhibit remarkably high resistance to the passage of moisture vapor. By "melt index," as used herein, is meant the weight of polymer, expressed in grams, extruded in 10 minutes through an orifice 0.0823 inch in diameter from a barrel 0.3760 inch in diameter under the force of a piston weighing 2160 grams, the polymer being maintained at 190° C. during the extrusion.

The invention claimed is:

Process for the preparation of a polypropylene composition having a low brittle point which comprises dissolving in a hydrocarbon solvent a crystalline polypropylene and an oxygenated derivative of crystalline polypropylene in a weight proportion of 90:10 to 99.5:0.5, said derivative having been obtained by contacting crystalline polypropylene having a molecular weight in the range of 50,000 to 300,000 at a temperature of from its melting point to about 260° C. with an atmosphere containing molecular oxygen for a time sufficient to introduce 1.5-3.7% by weight of oxygen into the polymer and yield an oxygenated derivative having a melting point in the range of 88-110° C., and co-precipitating the dissolved materials from solution.

References Cited in the file of this patent

UNITED STATES PATENTS

| 2,538,355 | Davis | Jan. 16, 1951 |
| 2,554,259 | Mikeska | May 22, 1951 |

OTHER REFERENCES

Raff: "Polyethylene," Interscience Publishers, Inc., New York (1956), pages 103 to 108 are relied upon.